(12) United States Patent
Klassen

(10) Patent No.: US 7,161,598 B2
(45) Date of Patent: Jan. 9, 2007

(54) METHOD OF RENDERING TEXT ON AN OUTPUT DEVICE

(75) Inventor: Gerhard D. Klassen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 178 days.

(21) Appl. No.: 10/786,029

(22) Filed: Feb. 26, 2004

(65) Prior Publication Data
US 2005/0190186 A1 Sep. 1, 2005

(51) Int. Cl.
G06T 11/00 (2006.01)
(52) U.S. Cl. ........................... 345/467; 345/468
(58) Field of Classification Search ........... 345/468, 345/469, 469.1, 470, 471, 467
See application file for complete search history.

(56) References Cited

U.S. PATENT DOCUMENTS

| | | | |
|---|---|---|---|
| 5,072,214 A | 12/1991 | Dellinger et al. | |
| 5,724,067 A | 3/1998 | Atchley et al. | |
| 6,043,826 A * | 3/2000 | Manning | 345/467 |
| 6,057,858 A | 5/2000 | Desrosiers | |
| 6,870,535 B1 * | 3/2005 | Hill et al. | 345/467 |
| 2001/0005207 A1 * | 6/2001 | Muikaichi et al. | 345/467 |
| 2002/0085006 A1 * | 7/2002 | Shade et al. | 345/471 |

FOREIGN PATENT DOCUMENTS

| WO | WO/02/09413 | 1/2002 |
|---|---|---|
| WO | WO0209413 | 1/2002 |

OTHER PUBLICATIONS

European Search Report for corresponding European Patent Application No. EP 04 25 1094, Jul. 29, 2004.

* cited by examiner

Primary Examiner—Ulka Chauhan
Assistant Examiner—Daniel C. Washburn
(74) Attorney, Agent, or Firm—Ridout & Maybee LLP

(57) ABSTRACT

A method of rendering text on an output device using a pre-developed image of a custom font. An image file defines an image of a custom developed character set. The custom character set may be developed off-line using graphics development tools. Associated character information enables the location of specific characters within the image. When a text character is output to a display or other output device, a custom font module locates the text character within the image and defines a subimage that contains the text character. The subimage is rendered upon the output device, thereby producing an image of the text character.

25 Claims, 5 Drawing Sheets

150

!"#$%&'()*+,-./0123456789:;<=>?@ABCDEFGHIJKLMNOPQRSTUVWXYZabcdefghijklmnopqrstuvwxyz

.0123456789:AMPahmop

FIG. 6(b)

METHOD OF RENDERING TEXT ON AN OUTPUT DEVICE

FIELD OF THE INVENTION

The present invention relates to rendering text on an output device and, in particular, to the rendering of text in a custom font on an output device.

BACKGROUND OF THE INVENTION

Computing devices use a variety of fonts to render text characters or glyphs on a display, a printer, or other output device. In typical computing devices, a set of fonts are available to application programs or routines. When an application program outputs text characters in a certain font to a display, a graphics subsystem receives an instruction from the application program and renders the text characters on the display.

There are a number of prior art font types. One type is a bitmapped font wherein each character of the character set is defined with an array of bits. Another type is a vector-based font, wherein the shapes of the characters are defined mathematically. These fonts are more easily scaled than the bitmapped font.

There are a number of available application programs that allow a user to create a custom text images, including font characters, having a variety of visual enhancements. Some of the customizations that can be incorporated into a font include gradient fills, variable widths, outlines, shadows, and other artistic embellishments. These customizations can enhance the appearance of the text rendered using the custom font.

A drawback of using custom fonts is that there is significant overhead in creating this font data. Large and complex code is required to render a complex custom font. This creates a difficulty for user devices that have limited processing and memory capacity but wish to display a custom font.

SUMMARY OF THE INVENTION

The present invention provides a method of rendering text in a custom font that uses an image of the custom font in a standard image format for which the user device already has rendering code. The character set for the custom font is stored in an image file and small portions of the image corresponding to individual text characters are rendered to output a text string.

In one aspect, the present invention provides, in a user device, a method of rendering text on an output device, the user device including an image file defining an image of a custom character set, the user device having stored thereon associated character information, the associated character information including at least one character width for the custom character set. The method includes the steps of locating a selected character from the custom character set within the image based upon the associated character information; defining a portion of the image containing the selected character; and rendering the portion on the output device.

In another aspect the present invention provides a user device, including an output device; a graphics subsystem for rendering graphics upon the output device; memory, the memory having stored thereon an image file defining an image of a custom character set and associated character information, the associated character information including at least one character width for the custom character set; and a custom font module for locating a selected character from the custom character set within the image file based upon the associated character information, and defining a portion of the image containing the selected character, wherein the graphics subsystems renders the portion on the output device.

In yet a further aspect, the present invention provides a computer program product having a computer-readable medium tangibly embodying computer executable instructions for rendering text on an output device in a user device, the user device including an image file defining an image of a custom character set, the user device having stored thereon associated character information, the associated character information including at least one character width for the custom character set, the user device having a graphics subsystem for rendering images on the output device. The computer executable instructions include computer executable instructions for locating a selected character from the custom character set within the image based upon the associated character information; and computer executable instructions for defining a portion of the image containing the selected character, wherein the graphics subsystem renders the portion on the output device.

In yet another aspect, the present invention provides a mobile device. The mobile device includes a display screen; a graphics subsystem coupled to the display screen for rendering graphics upon the display screen; a memory, the memory containing an image file defining an image, the image including a custom character set, the memory further containing associated character information, the associated character information including character order information and at least one character width for the custom character set; a custom font module for locating a portion of the image containing a selected character from the custom character set within the image file based upon the associated character information, and producing a definition defining the portion of the image containing the selected character, wherein the graphics subsystem receives the definition and renders the portion on the display screen.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which:

FIGS. 6(*a*) and (*b*) show sample images of custom character sets, according to the present invention.

Similar reference numerals are used in different figures to denote similar components.

DESCRIPTION OF SPECIFIC EMBODIMENTS

The following description of one or more specific embodiments of the invention does not limit the implementation of the invention to any particular computer programming language or system architecture. The present invention is not limited to any particular operating system, mobile device architecture, or computer programming language. Moreover, although some of the embodiment described below include mobile devices, the present invention is not limited to mobile devices, nor to wireless communications system; rather, it may be embodied within a variety of user devices or terminals, including handheld devices, mobile telephones, personal digital assistants (PDAs), personal computers, audio-visual terminals, televisions, and other devices. In the embodiments described below, the user device includes an output device. Most typically, the output device includes a display screen. The display screen may include a plasma display, liquid crystal display, light emitting diode display, cathode ray tube, or other type of visual display device. The output device may also or alternatively include a printer or other output device for rendering graphics or text for viewing by a user.

Figure 1:
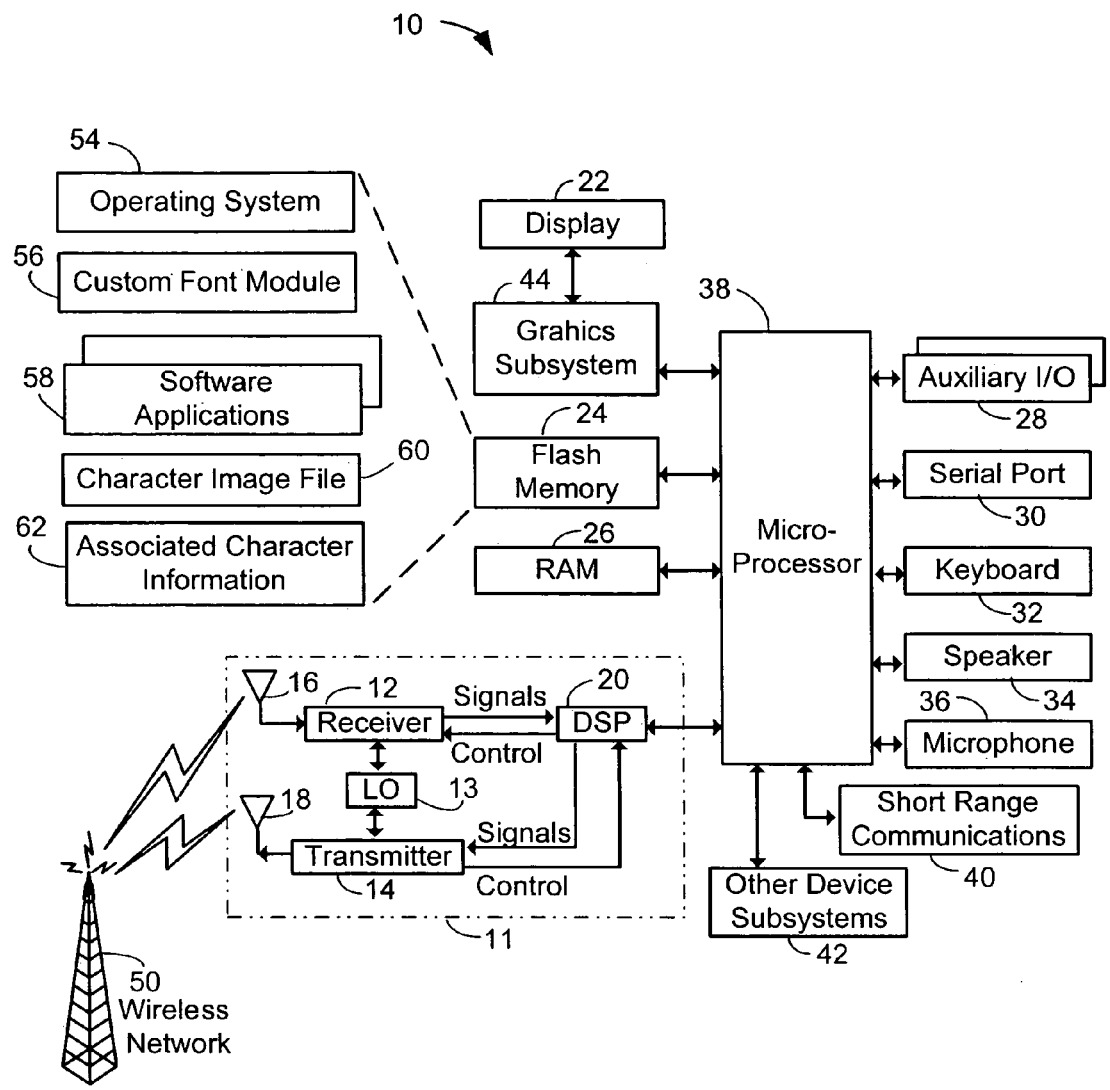
FIG. 1 shows a block diagram of a user device to which the present invention is applied in an example embodiment.

Referring now to the drawings, FIG. 1 is a block diagram of a user device to which the present invention is applied in an example embodiment. In the example embodiment, the user device is a two-way mobile communication device 10 having data and possibly also voice communication capabilities. In an example embodiment, the device 10 has the capability to communicate with other computer systems on the Internet. Depending on the functionality provided by the device 10, in various embodiments the device may be a data communication device, a multiple-mode communication device configured for both data and voice communication, a mobile telephone, a PDA enabled for wireless communication, or a computer system with a wireless modem, among other things. In various embodiments, the present invention may also be applied to handheld computing devices, such as PDAs and digital cameras, that are not enabled for communications.

In this embodiment, in which the device 10 is enabled for communications, the device 10 includes a communication subsystem 11, including a receiver 12, a transmitter 14, and associated components such as one or more, preferably embedded or internal, antenna elements 16 and 18, and a processing module such as a digital signal processor (DSP) 20. In some embodiments, the communication subsystem includes local oscillator(s) (LO) 13, and in some embodiments the communication subsystem 11 and a microprocessor 38 share an oscillator. As will be apparent to those skilled in the field of communications, the particular design of the communication subsystem 11 will be dependent upon the communication network in which the device 10 is intended to operate.

Signals received by the antenna 16 through a wireless communication network 50 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 50 via the antenna 18.

The device 10 includes the microprocessor 38 that controls the overall operation of the device. The microprocessor 38 interacts with communications subsystem 11 and also interacts with further device subsystems such as the graphics subsystem 44, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics or text upon the display 22.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of software applications 58 which control basic device operations, including at least data and voice communication applications for example, will normally be installed on the device 10 during manufacture. Further software applications 58 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22 through the graphics subsystem 44, or alternatively to an auxiliary I/O device 28. It is contemplated that the auxiliary I/O device includes an image rendering subsystem like the graphics subsystem 44 for rendering graphics and text upon the auxiliary I/O device 28. For example, a printer includes an image rendering subsystem for receiving and rendering image data. A user of device 10 may also compose data items within a software application 58, such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

Figure 2:
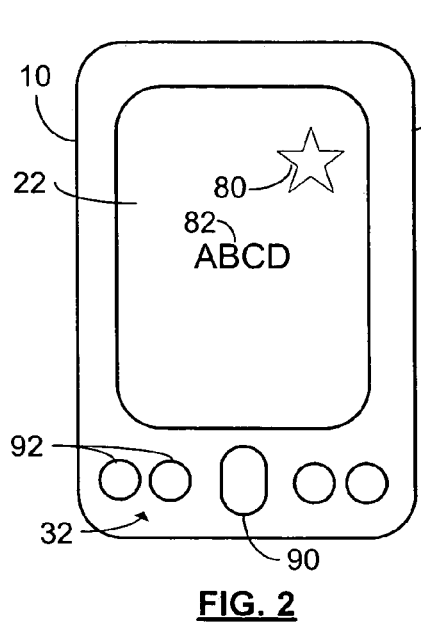
FIGS. 2 through 4 show a front view, side view, and back view, respectively, of an embodiment of a user device.
Figure 3:
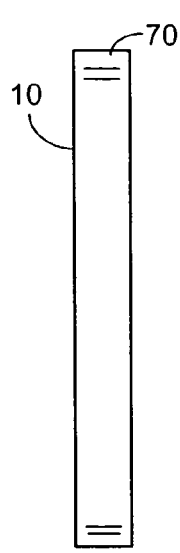
Figure 4:
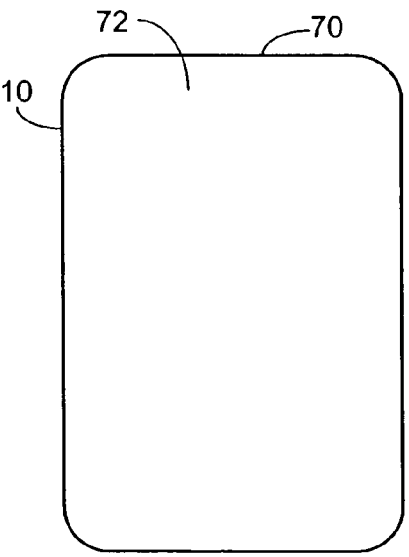
Figure 5:
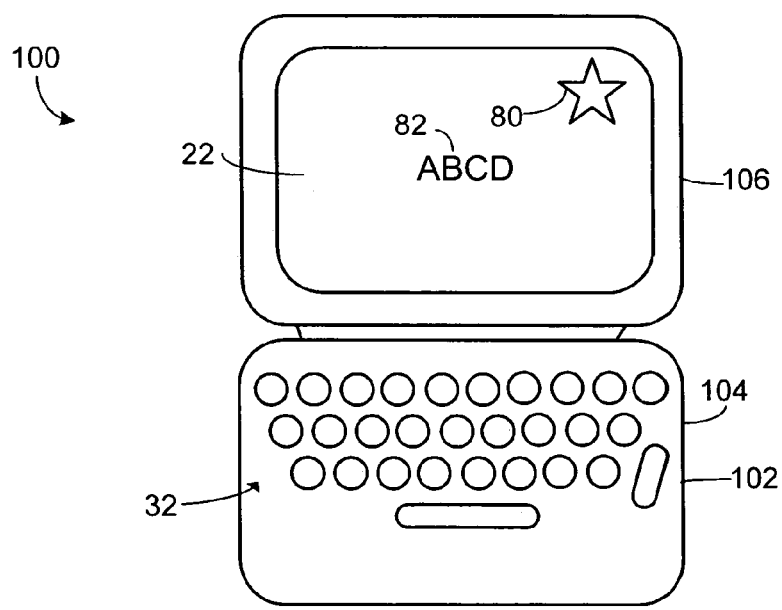
FIG. 5 shows a front view of a further embodiment of a user device.

With reference to FIGS. 2 to 4, in an example embodiment the components and subsystems of mobile device 10 are housed within a hard plastic main body case 70 that is configured to be held with one or two hands while the device 10 is in use. The main body case 70 may be a single piece or may include two or more portions coupled together. For example, in one embodiment, the device comprises a "flip-open" device 100 meaning that the main body case 70 includes two portions hinged together such that the two portions may be brought into closed contact with one another when the device 100 is not in use, as with the embodiment shown in FIG. 5. The various components of the device 100 need not be located in the same portion of the main body case 70.

The case 70 may include a hook (not shown) so that it can be secured to a user's belt or pant's top, or it may be used in conjunction with a soft case (not shown) that can be mounted to the user's belt or pant's top and into which the mobile device 10 can be inserted for carrying. Mobile device 10 will typically be small enough to fit inside a standard purse or suit jacket pocket. The display 22 is visible from the front of the device, as is keypad or keyboard 32. The keyboard 32 includes buttons or keys 90, 92 positioned to be actuated by the thumbs or fingers of the user. In the illustrated embodiment of FIG. 2, the keyboard has relatively few keys, however in some embodiments, the keyboard includes 26 or more alphanumeric and control keys. The display 22 is capable of outputting text 82 and graphics 80 rendered by the graphics subsystem 44 (FIG. 1).

Referring again to FIG. 1, the device 10 includes a character image file 60. Character image file 60 is a file in a standard image format, such as a bit-mapped (raster) format like GIF or PNG, or in a vector font format. The image defined in character image file 60 is an image of a custom character set. The custom character set is a set of characters (also called glyphs) making up a particular font. The custom characters of the font are developed off-line using sophisticated development tools to create a custom font having the look and attributes desired. For example, it may be desirable for the characters to be shown in outline, have shadows, or other complex characteristics, such as gradient fills, variable widths, filter effects, or variable line widths. Those of ordinary skill in the art will be familiar with the types of development tools that are available to create custom fonts, such as the Adobe Photoshop™ software produced by Adobe Systems Incorporated, or the CorelDRAW™ software produced by Corel Corporation. Those of ordinary skill in the art will also appreciate the wide variety of alterations and effects that can be incorporated into a font.

Reference is now made to FIG. 6(*a*), which shows an example embodiment of an image 150 defined in a character image file 60 (FIG. 1). The image 150 includes a number of alphanumeric and symbolic characters or glyphs developed off-line using an image development tool and saved in a bitmapped image format. FIG. 6(*b*) shows another example embodiment of an image 152 defined in a character image file 60. The image 152 reflects a reduced set of characters intended for displaying the time on an output device, such as a display 22 (FIG. 1). By only including those glyphs or characters needed to display time information the costs associated with the font are reduced.

Referring again to FIG. 1, the device 10 further includes associated character information 62. The associated character information 62 may be stored separately from the character image file 60 or may be incorporated as a part of the character image file 60, such as within the header. In one embodiment, the associated character information 62 is stored as an XML file, which during run-time is converted into a run-time memory object by the Java Virtual Machine (JVM). Other methods of storing the associated character information 62 will be apparent to those of ordinary skill in the art.

The associated character information 62 facilitates the location of specific characters within the character image file 60. For example, the associated character information 62 includes a value for the character width. This value may indicate the width of each character in pixels. In one embodiment, the character set in the character image file 60 includes all the standard characters in the ASCII character set in the order defined by the ASCII standard. In this case, the associated character information 62 may include a flag indicating that the font is in ASCII format, the starting position of the first character in the image file 60, and the width of the characters. If all the characters are the same width, then only a single width value need be stored in the associated character information 62. In other embodiments, the width of characters may vary from character to character, such as in a true-type font, in which case the associated character information 62 may specify the width of each character; or, alternatively, a standard width and the width of any character that deviates from the standard width. In other embodiments, the character image file 60 may not contain a full set of ASCII characters in the predefined order. In such a case, the associated character information 62 may identify the characters within the character image file 60 and the order in which they are placed.

Other information may also be included in the associated character information 62. For example, the relative advance may be specified in the case of an italics-style font. Relative advance information accounts for situations where the width of the character differs from the distance that the output module should move before placing the next character. Additionally, the character image file 60 may not contain a "space" character, in which case the associated character information 62 may include data defining the width of the space character.

The function of the associated character information 62 is to allow for the identification and location of a specific character within the character image file 60. By defining the width of the character, a portion of the image file that contains only the specific character may be defined. In one embodiment, the defined portion is a small rectangle within the image containing the specific character, although the defined portion need not be rectangular.

Accordingly, the character image file 60 contains an image containing each of the characters (or glyphs) in the complex custom font developed off-line. The associated character information 62 provides the specifics necessary to locate and define a portion of the image for each character. In this manner, when the device 10 (FIG. 1) outputs text in the custom font to the display 22 or other output device, the text is created by rendering those portions of the image corresponding to the individual characters in the text string. By having the complex font "pre-rendered" in the image, the device 10 avoids having to incorporate the sizable complex code required to create the customized font. Instead, the pre-rendered bitmapped image of the font is used and the graphics subsystem 44 (FIG. 1) renders the small portions associated with the characters of the desired text string.

Referring again to FIG. 1, the device 10 includes a custom font module 56. The custom font module 56 performs the function of selecting or defining the portion of the image stored in the character image file 60 for a particular text character. The custom font module 56 bases its selection of the portion upon the associated character information 62 which defines the relative positioning of the characters in the character image file 60.

In a first embodiment, a software application 58 or other routine in operation upon the device 10 includes code to invoke the custom font module 56 when the application 58 or routine intends to output text in the custom font to the display 22. The custom font module 56 receives the text that the software application 58 or routine intends to display and it selects the portions of the image defined in the character image file 60 corresponding to the characters in the text. The graphics subsystem 44 then renders these portions for output on the display.

In another embodiment, the software application 58 or other routine is unaware of the special nature of the custom font. When the application 58 or routine intends to output a text string to the display 22, it instructs the graphics subsystem 44 to "draw text". The graphics subsystem 44 recognizes that the custom font requires handling by the custom font module 56. Accordingly, the graphics subsystem 44 calls (or invokes) the custom font module 56, which then defines the portions of the character image file 44 for rendering upon the display 22 by the graphics subsystem 44. It will be appreciated that in some embodiments the custom font module 56 may be incorporated within the graphics subsystem 44 and is shown separately in FIG. 1 for ease of illustration.

In some embodiments, the custom font module 56 clips the portion of the image corresponding to a selected character and passes the clipped portion of the image to the graphics subsystem 44. The custom font module 56 may create an object containing the clipped image information and may pass this object to the graphics subsystem 44. The clipped image information may alternatively be stored in a small image file or data structure. Other mechanisms for extracting the data corresponding to the portion of the image and passing the data to the graphics subsystem 44 for rendering will be understood by those of ordinary skill in the art.

In another embodiment, the overhead associated with actually clipping the portion and passing it to the graphics subsystem 44 as a separate file or object may be avoided by simply passing the graphics subsystem 44 a definition of the portion. In such an embodiment, the custom font module 56 defines, but does not go so far as to clip, the portion of the image corresponding to a selected character. This definition is used by the graphics subsystem 44 to understand what portion of the overall image it is to render on the display 22.

Figure 7:
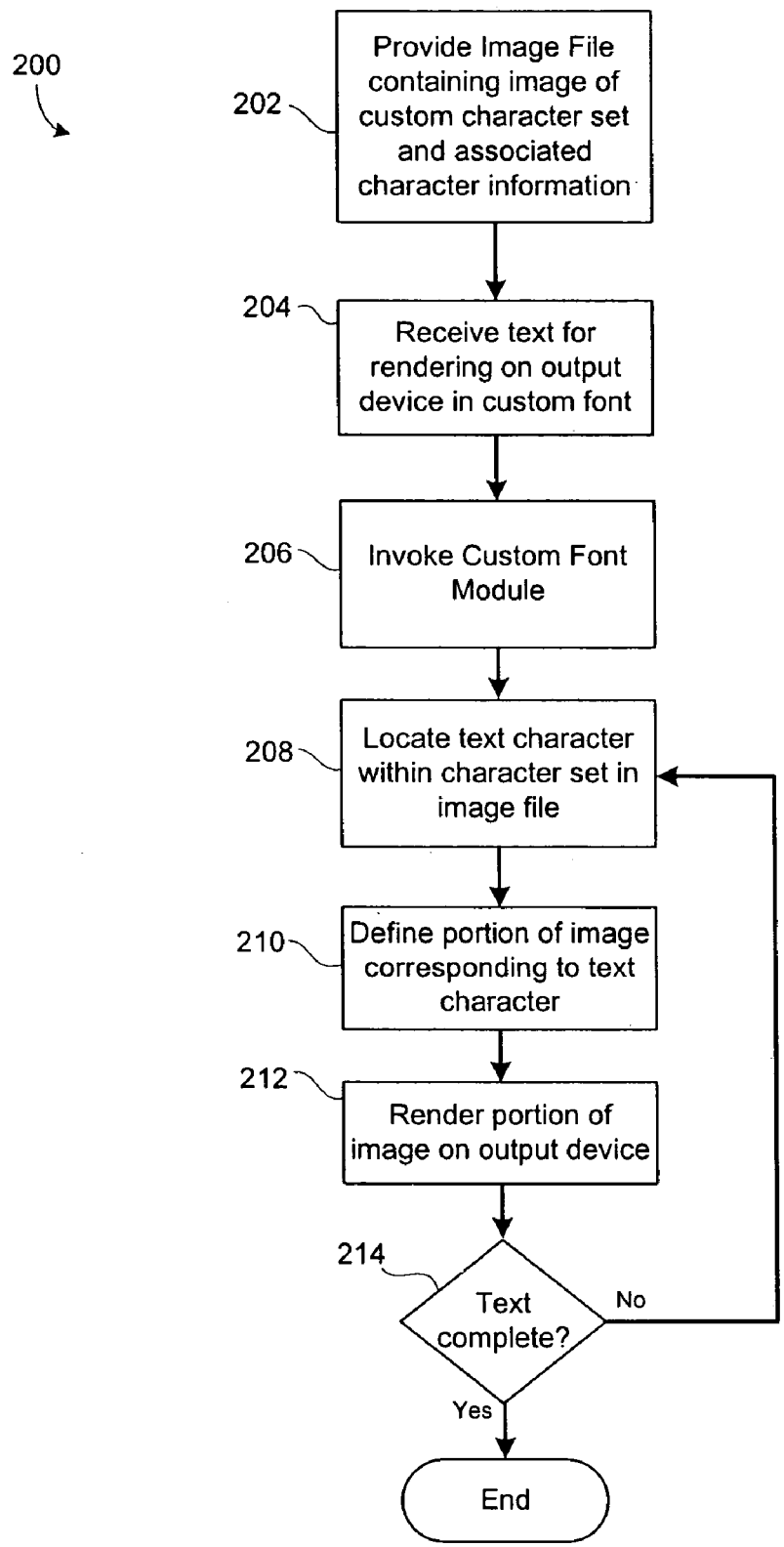
FIG. 7 shows, in flowchart form, a method of rendering text on an output device.

Reference is now made to FIG. 7, which shows a method 200 of rendering text on an output device, according to the present invention. The method 200 begins in step 202 with the creation and storage of the character image file 60 (FIG. 1) defining the image of the custom character set. Step 202 also includes the creation and storage of the associated character information 62 (FIG. 1) on the device 10 (FIG. 1). The character image file 60 and the associated character information 62 may be uploaded to the device 10 through the serial port 30 (FIG. 1), through the short-range communications subsystem 40 (FIG. 1), or through the communication subsystem 11 (FIG. 1) from the wireless network 50 (FIG. 1). They may also be uploaded to the flash memory 24 prior to complete assembly of the device 10. It will be appreciated that in some embodiments the character image file 60 and associated character information 62 may be updated or replaced with new custom font information over time. In one embodiment, the device manufacturer may distribute an updated character image file and updated associated character information to deployed devices through the wireless network 50.

In step 204, the graphics subsystem 44 (FIG. 1) receives an instruction to output a text string to the display 22. The instruction may come from a software application 58 such as a word processing program, an e-mail program, or other program. The instruction may also come from a routine, such as a operating system routine. For example, an operating system routine may be designed to put the date and time in the lower right hand corner of the display 22 for the device 10. The custom font may have been developed specifically for this purpose and the use of this font may be specified by the operating system routine when it instructs the graphics subsystem 44 to output the current date and time.

The graphics subsystem 44 recognizes that the custom font is requested, so in step 206 it invokes the custom font module 56. The custom font module 56 then, in step 208, identifies the first text character in the text string and locates the corresponding character image in the image defined by the character image file 60 using the associated character information 62. The custom font module 56 then defines the portion of the image corresponding to the first text character in step 210.

Based upon the definition of the portion of the image, the graphics subsystem 44 renders the portion of the image on the display 22, thereby outputting an image of the first text character to the display 22 in step 212.

In step 214, the custom font module 56 determines whether it has reached the end of the string of text. If not, then it continues to the next character in the string. If so, then the method 200 ends.

It will be appreciated that some of the steps of the above method 200 may be performed in a different order and some may be combined with others. For example, in one embodiment the custom font module 56 locates each character in the image and creates a definition for the character. When asked to render a text string, the custom font module 56 provides the graphics subsystem 44 with the predetermined definitions corresponding to the characters of the text string.

As noted above, although the above embodiments describe the present invention in the context of mobile devices using a wireless network, those of ordinary skill in the art will appreciate that it is not so limited. In some embodiments, the mobile devices may be user terminals, such as desktop or laptop computers, or other devices.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. In a user device, a method of rendering text on an output device, the user device including an image file defining a single image of a custom character set including a plurality of characters, the user device having stored thereon associated character information, the associated character information including at least one character width for said custom character set, the method comprising the steps of:
    locating a selected character from said custom character set within said image based upon said associated character information;
    defining a portion of said image containing said selected character and excluding at least one other of said plurality of characters; and
    rendering said portion on the output device.

2. The method claimed in claim 1, wherein said step of defining includes defining a subimage within said image, said subimage having a width corresponding to said at least one character width.

3. The method claimed in claim 1, wherein said step of defining includes creating a definition and passing said definition to a graphics subsystem, and wherein said graphics subsystem performs said step of rendering.

4. The method claimed in claim 1, wherein said associated character information includes a character order, and said step of locating includes identifying the location in said image of said selected character based upon said at least one character width and said character order.

5. The method claimed in claim 1, wherein said image file comprises a bitmapped image file.

6. The method claimed in claim 1, wherein said output device comprises a display, and said step of rendering includes rendering said portion on said display.

7. The method claimed in claim 1, further including steps of developing said custom character set off-line and creating and storing said image file on said user device.

8. A user device, comprising:
    an output device;
    a graphics subsystem for rendering graphics upon said output device;
    memory, said memory having stored thereon associated character information and an image file defining a single image of a custom character set including a plurality of characters, said associated character information including at least one character width for said custom character set; and
    a custom font module for locating a selected character from said custom character set within said image file based upon said associated character information, and defining a portion of said image containing said selected character and excluding at least one other of said plurality of characters, wherein said graphics subsystem renders said portion on said output device.

9. The device claimed in claim 8, wherein said custom font module includes a component for passing a definition to said graphics subsystem, said definition defining said portion.

10. The device claimed in claim 8, wherein said portion includes a subimage within said image, said subimage having a width corresponding to said at least one character width.

11. The device claimed in claim 8, wherein said custom font module executes within said graphics subsystem.

12. The device claimed in claim 8, wherein said associated character information includes a character order and said custom font module identifies the location in said image of said selected character based upon said at least one character width and said character order.

13. The device claimed in claim 8, wherein said image file comprises a bitmapped image file.

14. The device claimed in claim 8, wherein said output device comprises a display.

15. A computer program product having a computer-readable medium tangibly embodying computer executable instructions for rendering text on an output device in a user device, the user device including an image file defining a single image of a custom character set-including a plurality of characters, the user device having stored thereon associated character information, the associated character information including at least one character width for said custom character set, the user device having a graphics subsystem for rendering images on the output device, the computer executable instructions comprising:
    computer executable instructions for locating a selected character from said custom character set within said image based upon said associated character information; and
    computer executable instructions for defining a portion of said image containing said selected character and excluding at least one other of said plurality of characters,
    wherein said graphics subsystem renders said portion on the output device.

16. The computer program product claimed in claim 15, wherein said computer executable instructions for defining include computer executable instructions for defining a subimage within said image, said subimage having a width corresponding to said at least one character width.

17. The computer program product claimed in claim 15, wherein said computer executable instructions for defining include computer executable instructions for creating a definition and passing said definition to said graphics subsystem.

18. The computer program product claimed in claim 15, wherein said associated character information includes a character order, and said computer executable instructions for locating include computer executable instructions for identifying the location in said image of said selected character based upon said at least one character width and said character order.

19. The computer program product claimed in claim 15, wherein said image file comprises a bitmapped image file.

20. The computer program product claimed in claim 15, wherein said output device comprises a display.

21. A mobile device, comprising:
    a display screen;
    a graphics subsystem coupled to said display screen for rendering graphics upon said display screen;
    a memory, said memory containing an image file defining a single image of a custom character set including a plurality of characters, said memory further containing associated character information, said associated character information including character order information and at least one character width for said custom character set;

a custom font module for locating a portion of said image containing a selected character from said custom character set within said image based upon said associated character information, and producing a definition defining said portion of said image containing said selected character and excluding at least one other of said plurality of characters, wherein said graphics subsystem receives said definition and renders said portion on said display screen.

22. The mobile device claimed in claim 21, wherein said mobile device comprises a handheld mobile device.

23. The mobile device claimed in claim 21, wherein said image file includes a file having a standard image format.

24. The mobile device claimed in claim 21, wherein said custom character set includes a plurality of glyphs comprising a font.

25. The mobile device claimed in claim 24, wherein said selected character includes two or more adjacent glyphs.

* * * * *